(12) United States Patent
Oshida

(10) Patent No.: US 6,366,233 B1
(45) Date of Patent: Apr. 2, 2002

(54) DME SYSTEM WITH BROADCASTING FUNCTION

(75) Inventor: Naohito Oshida, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/412,911

(22) Filed: Oct. 5, 1999

(30) Foreign Application Priority Data

Oct. 7, 1998 (JP) .......................................... 10-285418

(51) Int. Cl.$^7$ ................................................ G01S 13/87
(52) U.S. Cl. ........................................ 342/47; 342/57
(58) Field of Search .............................. 342/46, 47, 50, 342/52, 57, 58, 59

(56) References Cited

U.S. PATENT DOCUMENTS

| 5,450,329 A | * | 9/1995 | Tanner ........................ 364/449 |
| 5,798,726 A | * | 8/1998 | Schuchman et al. .......... 342/37 |
| 5,933,099 A | * | 8/1999 | Mahon ........................ 340/961 |
| 5,969,668 A | * | 10/1999 | Young, Jr. .................. 342/357 |

FOREIGN PATENT DOCUMENTS

JP 2-47710 10/1990

* cited by examiner

Primary Examiner—John B. Sotomayor
(74) Attorney, Agent, or Firm—Ostrolenk, Faber, Gerb & Soffen, LLP

(57) ABSTRACT

Frequency resources of a DME/TACAN band specified for the aircraft band are effectively utilized, and a GPS reinforcing data is overlapped onto distance information to be broadcast. A header is added to a DGPS reinforcing data, and the transmitting pulse level of a conventional ground DME system is modulated, and the data is broadcast to an airborne system. In the airborne system, a threshold value of "1" and "0" is generated by a level detecting device (5), and the start point of the data is detected by a header detecting device (6), and the reinforcing data is supplied to the airborne system. Consequently, the function of broadcasting a data by overlapping the data onto the distance information of the DME is achieved. Since the DME uses the L band, the radio interference with the existing ILS, VOR, aircraft radio transmission, and broadcasting station can be avoided.

17 Claims, 6 Drawing Sheets

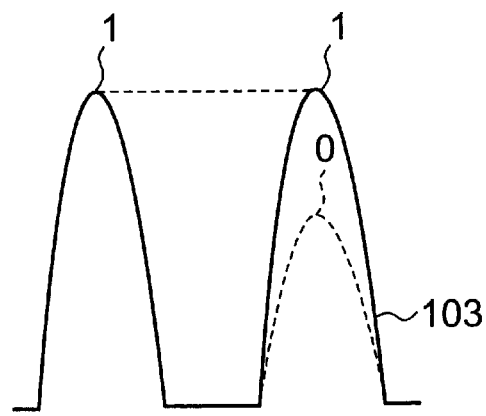
FIG.6(a) TRANSMITTING WAVE FORM
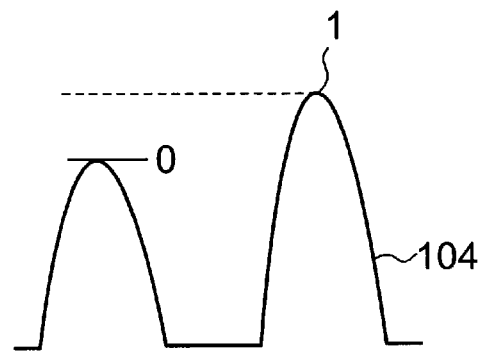
FIG.6(b) TRANSMITTING WAVE FORM

DME SYSTEM WITH BROADCASTING FUNCTION

BACKGROUND OF THE INVENTION

1. Field of the Invention

The present invention relates to a DME (Distance Measuring Equipment) system, and specifically, it relates to a GBAS (Ground Based Augmentation System) which broadcasts a reinforcing data of the GPS in the DGPS from a ground unit.

2. Description of the Prior Art

Previously, an amplitude of the pulse transmitted from a DME ground unit has automatically been controlled so as to become a constant value by a method shown in Japanese Patent Publication No. 2-47710. Accordingly, there is no data broadcasting function in pulses other than that of the Morse code which is transmitted once for every 30 seconds.

On the other hand, in case of constructing a landing guidance system using the GPS, it is necessary to transmit the data to reinforce the accuracy and integrity of the GPS. Therefore, at present, a data broadcasting system using a VHF which is used by an ILS (Instrument Landing System) and a VOR (VHS Omnidirectional Radiorange) is being developed.

However, this frequency band has already been assigned to a lot of facilities, and the interference with the ILS, the VOR and the aeronautical radio is inevitable. For obtaining a sufficient number of stations, there is such a problem that it is necessary to wait for the removal or service stop of the ILS or the VOR.

A conventional DME system gives attention to the pulse width, and works so as to keep the sliced pulse width constant, and as a result, the amplitude is also kept constant, and therefore, it is impossible to perform the data broadcasting by the amplitude modulation method using this DME unit.

Furthermore, as mentioned above, the data broadcasting system using the VHF has such a disadvantage that the interference with the ILS or the VOR is inevitable in this country where the assignment of frequencies has already been saturated. In order to solve this problem, there is a method of improving the spectrum, but it has a disadvantage of requiring a large-scale unit.

SUMMARY OF THE INVENTION

It is an object of the present invention to provide means by effectively utilizing the frequency resource of the DME/TACAN band specified for the aircraft band, and which overlaps the GPS augmentation data onto the distance information and broadcasts that.

It is another object of the present invention to achieve the GBAS function without mounting any new unit on the aircraft side.

A DME system of the present invention is characterized by modulating the amplitude of the transmitting pulse of a DME ground station within an allowable range so as to transmit information other than the distance information and the station identification code (ID).

In the present invention, in order to clearly express the start point of the data and to make the bit synchronization easy, a training sequence and a unique word which include "1" and "0" and have previously been determined are added just before the data by header adding means. In this header, the training sequence is used as the reference value of level "1" and level "0" showing the data, and the unique word is used for preventing a wrong detection of a signal because of wave form degradation caused by noise or propagation.

The present invention comprises: a ground unit having level modulating means which modulates the output of a conventional DME transmitter in a way of level modulation for each paired pulse stimulation according to a signal including "1" and "0" with a header; a detecting means which detects level "1" and level "0" of the video output of a conventional airborne DME receiver; and an air borne DME unit having a decoding means which judges "1" or "0" from this level signal and the receiving pulse timing.

The header adding means adds a header including a previously determined code string of "1" and "0" just before the inputted data. This header includes a training sequence and a subsequent unique word. The training sequence includes "1" and "0" which are alternately repeated, and clearly expresses the level average of "1" and "0." Furthermore, the unique word shows the start of information.

The level modulating means uses a method of changing the peak level of each paired pulse stimulation according to the information of "1" and "0" for each paired pulse stimulation by an attenuator or a pulse modulating means, and it changes the level of the output of a conventional ground DME transmitter according to this information of "1" and "0." At that moment, the transmitter separates a pulse showing "1" and a pulse showing "0," and keeps the pulse width constant, and it maintains the spectrum within the prescribed value.

The level detecting means provided in the airborne DME unit determines the average value of the receiving pulse level from the training sequence pulse received for a certain time, and it makes this average level (mean level) the threshold value to judge that a pulse higher than that value is "1" and a pulse lower than that value is "0."

The decoding means generates a signal string of "1" and "0" from this judgment value and the timing of the pulse receiving, and in the meantime, it detects a unique word from the signal string by correlation processing, and separates and outputs the data.

According to the present invention, for example, a header is added to the DGPS (Differential GPS) augmentation reinforcing data, and the transmitting pulse level of a conventional ground DME system is modulated, and the data is broadcast to an airborne system. In the airborne system, a threshold value of "1" and "0" is generated by the level detecting means, and the start point of the data is detected by the header detecting means, and the DGPS augmentation data is supplied to the airborne system. Consequently, it is possible to achieve the function of broadcasting a data by overlapping the data onto the distance information of the DME. Furthermore, since the DME uses the L band, the radio interference with the existing ILS, VOR, aircraft radio transmission, and broadcasting station can be avoided.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIGS. 6(a) and 6(b) are figures of the wave forms showing another embodiment of the present invention.

DETAILED DESCRIPTION OF THE PREFERRED EMBODIMENTS

Figure 1:
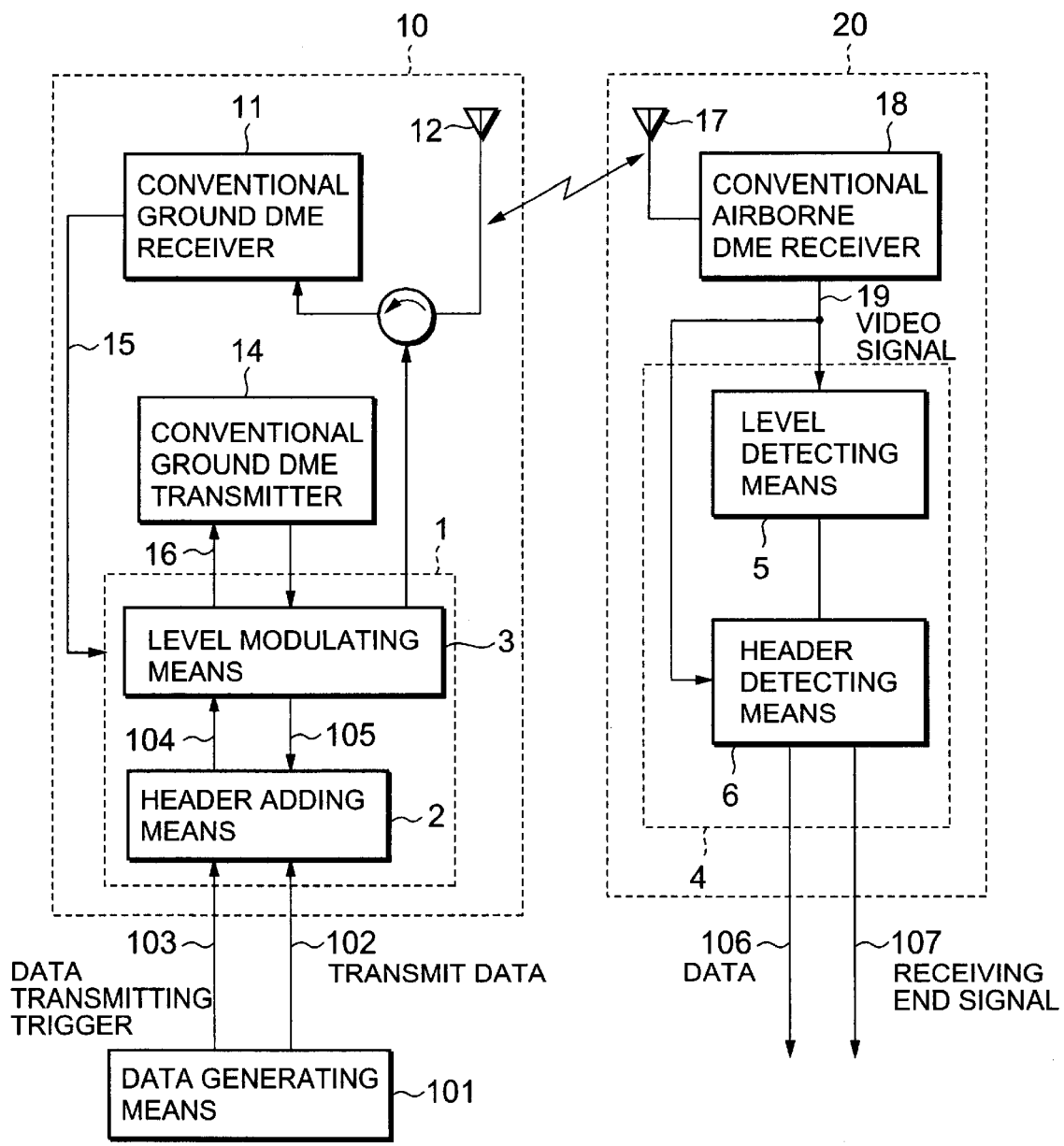
FIG. 1 is a block diagram showing an embodiment of the present invention.

FIG. 1 is a block diagram showing an embodiment of the present invention. As shown in FIG. 1, the embodiment of the present invention comprises broadcasting data adding means 1 which is provided in a ground DME unit 10 and has header adding means 2 and level modulating means 3, and broadcasting data detecting means 4 which is provided in an airborne DME unit 20 and has level detecting means 5 and header detecting means 6.

Figure 2:
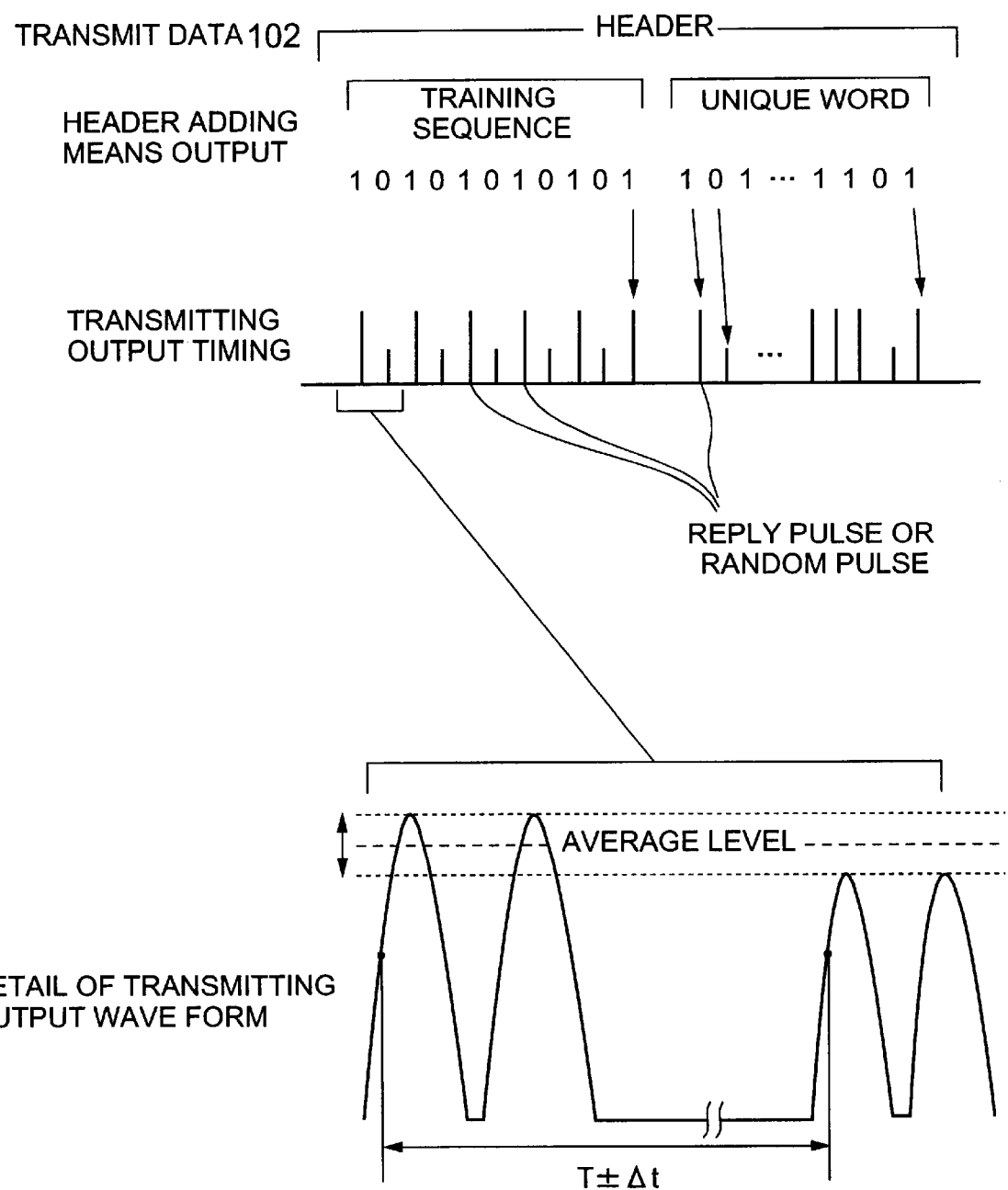
FIG. 2 is a timing chart for describing the operation of the present invention.

FIG. 2 is a timing chart showing the operation of the present invention. A transmit data 102 is inputted into the ground DME unit 10 from a data generating means 101. The header adding means 2 adds a header in which "1" and "0" are alternately arranged, before the transmit data 102. This header includes a training sequence which transmits the reference value of level "1" and level "0," and a unique word for clearly expressing the start point of the data. The transmit data 102 is sent out as a data with a previously determined specific length continuously after this unique word.

The relative frequency of "0" and "1" in the training sequence is precisely 50%, and the value determined by averaging peak levels of these pulses is most suitable for the threshold value of level "0" and level "1."

Furthermore, the unique word is a previously determined random string of "0" and "1." For example, in the case where the unique word is a word of 16 bits, letting the relative frequency of "1" and "0" be 50%, the probability Pu that all the data string of 16 bits is in accord is as follows:

$$Pu=0.5^{16}=1.52\times 10^{-5}$$

An example of the unique word is shown by Su as follows:

Su=000 010 011 110 000 001 101 110 001 100 011 111 101 111 100 010

The transmit data 102 having a header added is delivered to a level modulating means 3. The level modulating means 3 generates a transmitting trigger 16 of the header part at a previously determined interval T using a transmitting trigger 15 as a trigger, and inputs that into a conventional ground DME transmitter 14, and in the meantime, it outputs the output from the ground DME transmitter 14 in a way of damping or not damping the output by an attenautor or the like according to "0" or "1" of the data. This high frequency signal passes through a circulator 13, and through an antenna 12, it enters an airborne antenna 17, and is inputted into a conventional airborne DME receiver 18.

In the conventional airborne DME receiver 18, a normal processing of measuring distance is performed, and in the meantime, a video signal 19 of the receiving pulse is outputted to the outside. This signal is inputted into the broadcasting data detecting means 4, and is separated into a group with a large amplitude and a group with a small amplitude.

That is, in the level detecting means 5, the level of paired pulse stimulation of the video signal 19 is measured, and the average of the previously determined number of times (n times) is found by the sliding window to determine the threshold. Then, the result obtained by judging that the inputted video signal is "1" or "0" on the basis of this threshold is sent out to the header detecting means 6.

The header detecting means 6 detects a unique word by performing the correlation processing of the result obtained by judging that the signal is "1" or "0" in the level detecting means 5, and it outputs the signal following this unique word as a receive data 106.

Figure 3:
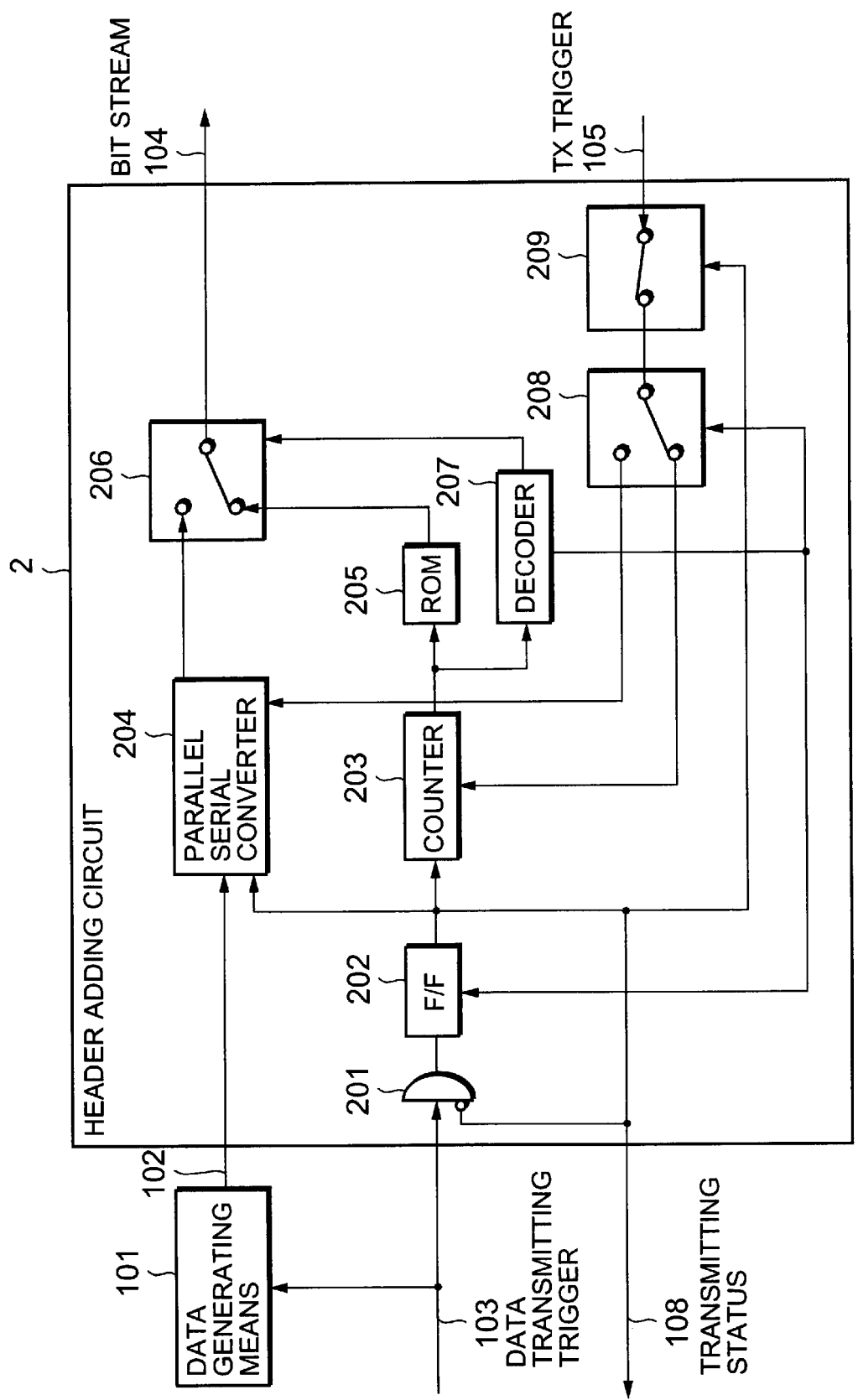
FIG. 3 is a block diagram showing a concrete example of the embodiment of the present invention.
Figure 4:
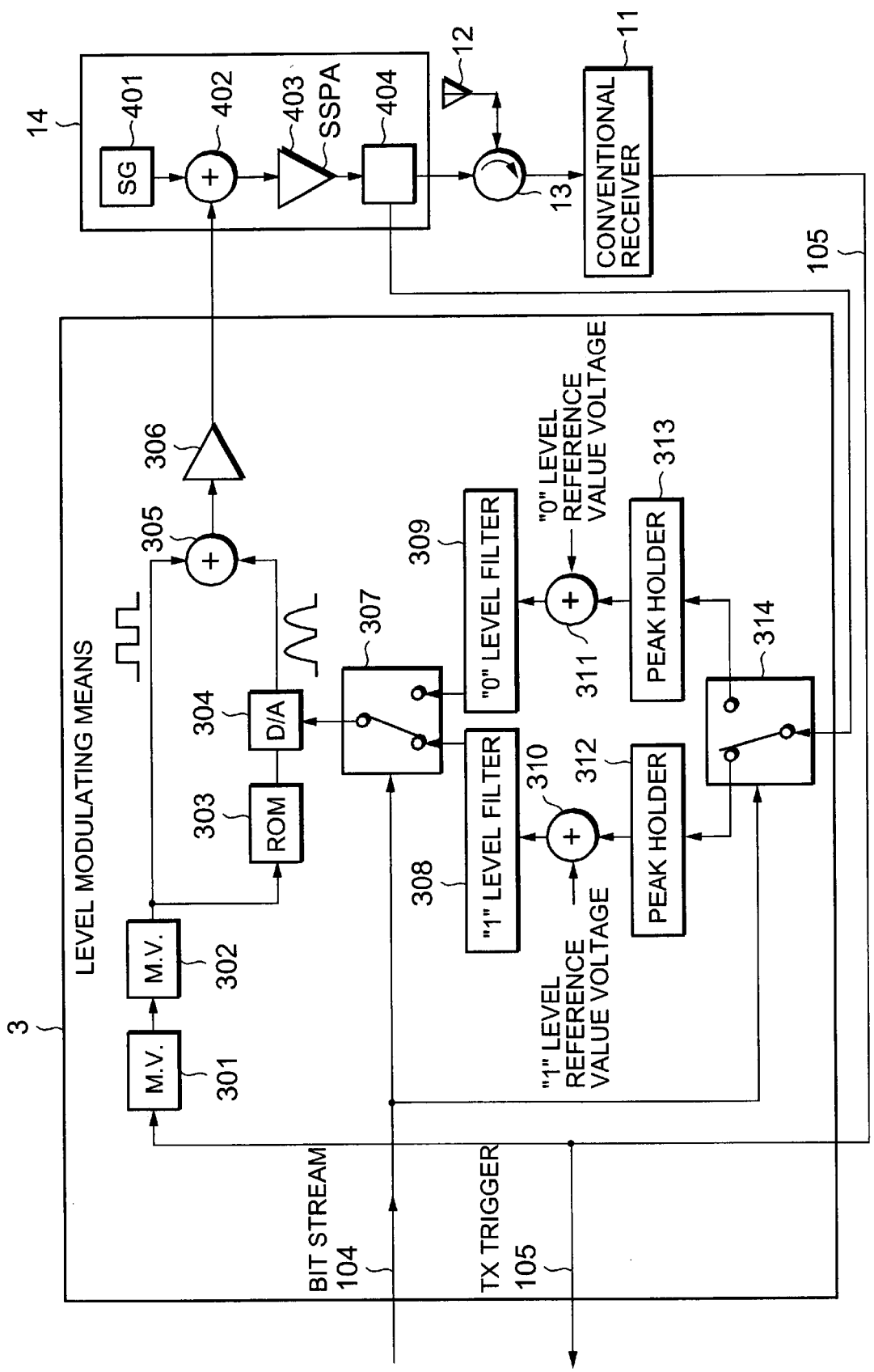
FIG. 4 is a block diagram showing a concrete example of the embodiment of the present invention.
Figure 5:
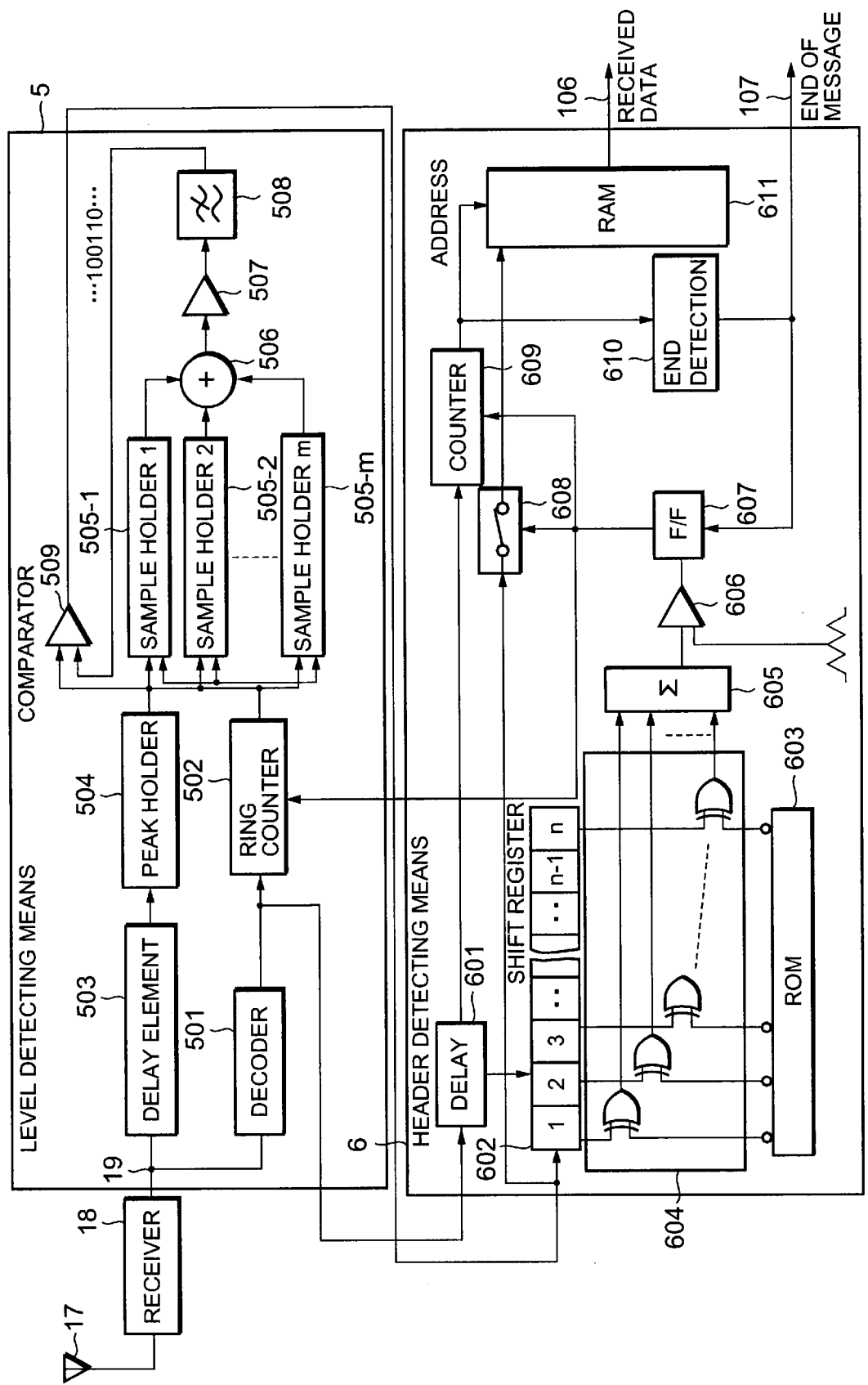
FIG. 5 is a block diagram showing a concrete example of the embodiment of the present invention.

Next, an example of the present invention will be described in detail by referring to drawings. FIG. 3 and FIG. 4 are respectively a block diagram showing an example of the header adding means 2 and a block diagram showing an example of the level modulating means of the ground unit 10, and FIG. 5 is a block diagram showing an example of level detecting means 5 and an example of the header detecting means 6 of the airborne unit 20.

In FIG. 3, by the input of a data transmitting trigger 103, a parallel data 102 is read out from a data generating means 101. The data transmitting trigger 103 passes through an AND gate 201, and it is inputted into a flip flop 202. The output of the flip flop 202 is set to "1" to set a parallel serial converter 204 in the operable state. The output of the flip flop 202 is used as a signal to show transmitting (transmitting status 108), and while making the AND gate 201 in the prohibited state, it turns a switch 209 in the ON state.

Furthermore, the output of the flip flop 202 makes a counter 203 in the operable state, and the counter 203 is counted up by a TX trigger 105. The output thereof is used as an address of a ROM 205. In the ROM 205, a training sequence and a unique word are recorded, and they are outputted to the level modulating means 3 through a switch 206. By the series of operations, a header is outputted to the level modulating means 3 just after the input of the data transmitting trigger.

After that, when the counter 203 reaches the previously determined value, a decoder 207 shifts the switch 206 to connect the output of the parallel serial converter 204 to the level modulating means 3. Furthermore, the output of the decoder 207 shifts a switch 208. Consequently, the TX trigger 105 is supplied to the parallel serial converter 204, and the information to be broadcast is inputted into the level modulating means 3 in a mode of a serial data.

In FIG. 4, the TX trigger 105 inputted into the level modulating means 3 passes through multi-vibrators 301, 302, and it is shaped to be a double pulse rectangular wave. Furthermore, the data recorded in a ROM 303 is converted into an analog signal by a D/A converter 304. This analog signal is made a previously distorted wave form for reducing the distortion of a solid state power amplifier (SSPA) 403. This signal and the reshaped double pulse rectangular wave are added by an operational amplifier 305 as analog values, and are amplified by a current amplifier 306, and are supplied to a modulator 402.

The CW output of an SG 401 is subjected to the pulse modulation by the modulator 402, and is amplified in the SSPA 403, and passing through a directional coupler 404 and a circulator 13, it is radiated via an antenna 12. A part of the signal sampled in the directional coupler 404 is inputted into a switch 314. The switch 314 is shifted by a bit stream 104 inputted from the header adding means 2, and the input signal is outputted to a peak holder 312 in the case where the bit stream 104 is "1," and it is outputted to a peak holder 313 in the case of "0."

The output of the peak holder 312 is compared with the "1" level reference voltage by the operational amplifier 310, and the difference thereof is inputted into a "1" level filter 308. The "1" level filter 308 operates as a loop filter of a feedback circuit to stabilize the "1" level pulse output. Similarly, the peak holder 313, an operational amplifier 311, and a "0" level filter 309 stabilizes "0" level pulse output.

On the other hand, the bit stream 104 shifts an analog switch 307 to connect the output of the "1" level filter 308 to the D/A converter 304 in the case of "1," and to connect the output of the "0" level filter 309 to the D/A converter 304 in the case of "0." Since the "0" level reference voltage is set to be lower than the "1" level reference voltage by 1 dB, the peak electric power of the pulse radiated via the antenna in the case of "0" is also lower than that in the case of "1" by 1 dB.

In FIG. 5, in the airborne unit 20, the signal inputted from a normal antenna 17 is received by a conventional airborne DME receiver 18. The video signal 19 outputted from the receiver 18 is inputted into a decoder 501 of the level detecting means 5. In the decoder 501, in the case where the input pulse signal has a regular pulse interval, the signal is judged to be a DME signal to be inputted into a ring counter 502. The output of the ring counter 502 sets the sample holders 505-1 to 505-m to be operable in turn. On the other hand, the peak level of the received video signal 19 inputted into a delay element 503 is detected by a peak holder 504.

Accordingly, by the decoder 501, only the peak levels of the pulses judged to be DME signals are going to be held in turn from the peak holder 504 to the sample holder 505-1 to 505-m. When m pieces of samples have been held, returning to the sample holder 1 again, the sample is held. This output is added by the operational amplifier 506 as an analog value.

According to this operation, if m pieces of bit streams of the training sequence have been set, the output of the operational amplifier 506 becomes a value proportional to the average value of the peak levels of the training sequences. This voltage is amplified in an amplifier 507, and passes through a filter 508, and is averaged, and it is supplied to the input on one side of a comparator 509 as the reference value. To the input on the other side of the comparator 509, the output of the peak holder 504 is connected. According to this configuration, the comparator 509 outputs "1" in the case where the peak level of the inputted video signal 19 is larger than the average value of the levels of the training sequences, and it outputs "0" in the case where the peak level is smaller than the average value.

In the header detecting means 6, the output of the decoder 501 is delayed by a delay circuit 601, and it is supplied to a shift register 602 as the clock. The output of the comparator 509 is inputted into the shift register 602, and it is latched after a certain delay each time there is a decode pulse. The shift register 602 has the same number of steps as the number of bits of the unique word.

Now, letting
Su=000 010 011 110 000 001 101 110 001 100 011 111 101 111 100 010, n=48 is given.

In a ROM 603, the reversed value of this value of Su is recorded in advance. Each bit of the ROM 603 and each bit of the shift register 602 are subjected to exclusive-OR by an exclusive-OR circuit 604. Then, the outputs of the exclusive-OR circuit from all bits are added by an adder 605. Accordingly, in the case where the inputted signal is set in the shift register 602 and each bit is equal to that of the unique word, the output of the adder 605 is 48.

When 1 bit has not yet been matched after the input started in the case where all contents of the shift register 602 were 0, the contents Ss of the shift register are as follows:
Ss=00 010 011 110 000 001 101 110 001 100 011 111 101 111 100 010 0 At this moment, the output of the adder 605 is a voltage corresponding to 32.

A comparator 606 has a voltage corresponding to 40 as the reference value for detecting this difference. The output of the comparator 606 is inputted into a flip flop 607. The flip flop 607 performs the work to show the receiving start of the broadcast data 102, and stops the ring counter 502 of the level detecting means. Furthermore, it makes a counter 609 operable, and in the meantime, it turns on a switch 608. Consequently, the bit stream to be inputted is stored in a RAM 611.

Furthermore, the output of the delay circuit 601 is counted by the counter 609, and when a previously determined number of pieces of signals are counted, a notice is given to an END detecting circuit 610 to stop a RAM 611. The END detecting circuit 610 resets the flip flop 607, and in the meantime, it gives the notice of a receiving end signal 107 to the outside. According to the series of processes, the broadcast data are accumulated in a RAM 611.

FIGS. 6(*a*) and 6(*b*) are figures of the waveforms showing another embodiment of the present invention. In the above first embodiment, the modulation is performed by the paired pulse stimulation by the data, but in the embodiment as shown in FIG. 6(*a*), one pulse of the paired pulse stimulation is made the reference pulse, and the other pulse is modulated by the data. That is, the reference level is put in a first pulse and the data is put in a second pulse. In this case, if the level of the first pulse is always level "1," it can easily be performed to judge the level of the second pulse which is the data.

Furthermore, as shown in FIG. 6(*b*), by inserting the paired pulse stimulation in which the level of the first pulse is "0" before the data transmitting, it is also possible to transmit the data start without using a header pulse string. If such a waveform is used, it is possible to simplify the processing circuit. Furthermore, since the reference pulse and the data pulse are close in terms of time, there is such an effect that it is difficult to be affected by the fluctuation of the level because of the movement of an aircraft or the like.

Of course, it is also obviously possible that the reference value of the first pulse is "0" and one in which the level of the first pulse is "1" is the header.

In addition to this, it is also considered to process the data to be transmitted. For example, it is considered to use an error correcting code, to overlap a bit scramble so that the relative frequency of "0" and "1" may be equal, to use an interleave method to cope with a burst error, to insert "0" or "1" according to a host protocol, or the like.

The data processing is considered to be a host protocol of the present invention, and the modulating procedure of the present invention is not affected by the presence or absence thereof.

According to the DME system of the present invention, it is possible to broadcast the data without affecting any conventional DME function.

Furthermore, since the VHF band in which the frequency assignment has already been saturated is not used but the DME/TACAN band in which the channel is divided for every 1 MHz is used, the frequency assignment is easy. Accordingly, the interference with existing landing systems such as the VOR or the ILS can completely be avoided.

Therefore, the use is possible without waiting for the removal of the VOR and ILS. For example, if the frequency of the terminal DME provided together with the ILS is used, the labor for changing the frequency in an aircraft is reduced.

Furthermore, since the same circuit as a conventional DME can be used at a high frequency, an aerial receiver can be shared in an aircraft, and an antenna and a transmitter can be shared on the ground.

What is claimed is:

1. A DME system including a ground unit which provides distance information by using paired pulses and an airborne unit which receives said distance information, wherein said ground unit has changing means for changing a peak level of the paired pulses according to augmentation data to transmit said augmentation data with said distance information to said airborne unit; and said airborne unit has detecting means for detecting a pulse peak level of received paired pulses to receive said augmentation data.

2. A DME system as claimed in claim 1, wherein said augmentation data has header data having a predetermined pattern and said ground unit has decoding means for decoding said header data.

3. A DME system as claimed in claim 2, wherein said header data comprise a training sequence which has a reference value corresponding to data "1" and "0".

4. A DME system as claimed in claim 2, wherein said header data comprise a training sequence which has a unique word for clearly expressing a start point of said augmentation data.

5. A DME system as claimed in claim 1, wherein said augmentation data are reinforcing data of GPS.

6. In a DME unit to provide distance information from a ground unit to an airborne unit, a DME system with a broadcasting function, comprising:

changing means which changes a peak level of paired pulse stimulation sent from a ground DME unit according to a signal including "1" and "0" and having a header added, according to a transmit data;

detecting means which detects a pulse peak level of a receiving video output of an airborne DME unit as "1" and "0"; and decoding means which decodes said header, wherein the DME system broadcasts information to an aircraft which is providing DME information.

7. In a DME unit to provide distance information from a ground unit to an airborne unit, a DME system with a broadcasting function, comprising: modulating means which uses a pulse on one side of paired pulse stimulation sent from a ground DME unit according to a transmit data including "1" and "0" as a reference pulse, and which modulates a pulse on the other side by said transmit data; adding means which adds said paired pulse stimulation modulated so that a start of said transmit data may be discriminated before said transmit data as a header; detecting means which detects paired pulse stimulation showing said header from a receiving video output of an airborne DME unit; and reading out means which reads out said transmit data from said pulse on the other side by using said pulse on one side of the paired pulse stimulation following said pair pulse stimulation showing the header as a reference, wherein the DME system broadcasts information to an aircraft which is providing DME information.

8. The DME system with a broadcasting function as claimed in claim 7, wherein in said paired pulse stimulation to transmit a data, a first pulse thereof is a pulse of level "1" showing a reference and a second pulse thereof is a data pulse shown by either "1" or "0," and in said paired pulse stimulation to show a header, a first pulse thereof is a pulse of level "0" and a second pulse thereof is a pulse of level "1".

9. A ground unit for a DME system with a broadcasting function, comprising header adding means which adds a header to a transmit data from data generating means and level modulating means into which the header and the transmit data outputted from said header adding means are inputted and which modulates paired pulse stimulation outputted from a ground DME transmitter by amplitude modulation by using said header and said transmit data.

10. An airborne unit for a DME system with a broadcasting function, comprising level detecting means which receives paired pulse stimulation transmitted from a ground DME transmitter and which judges whether a data signal overlapped onto said paired pulse stimulation is "1" or "0" by comparing a level of said received paired pulse stimulation with a reference level, and header detecting means which discriminates a header added to a transmit data transmitted from said ground DME transmitter on the basis of results judged by said level detecting means and which extracts the transmit data.

11. A DME system including a ground unit which provides distance information by using paired pulses and an airborne unit which receives said distance information, wherein said ground unit has a changing device that changes a peak level of the paired pulses according to augmentation data to transmit said augmentation data with said distance information to said airborne unit; and said airborne unit has a detector that detects a pulse peak level of the received paired pulses to receive said augmentation data.

12. A DME system as claimed in claim 11, wherein said augmentation data is comprised of a header having a predetermined pattern and said ground unit includes a decoder that decodes said header.

13. A DME system as claimed in claim 12, wherein said header is comprised of a training sequence which has a reference value corresponding to data "1" and "0".

14. A DME system as claimed in claim 12, wherein said header is comprised of a training sequence which has a unique word for clearly expressing a start point of said augmentation data.

15. A DME system as claimed in claim 11, wherein said augmentation data are reinforcing data of GPS.

16. A ground unit for a DME system with a broadcasting function, comprising an adder which adds a header to transmission data from data generating means and a level modulator into which the header and transmission data outputted from said adder are inputted and which modulates a paired pulse stimulation outputted from a ground DME transmitter by amplitude modulation by using said header and said transmission data.

17. An airborne unit for a DME system with a broadcasting function, comprising a level detector which receives a paired pulse stimulation transmitted from a ground DME transmitter and which judges whether a data signal overlapped onto said paired pulse stimulation is "1" or "0" by comparing a level of said received paired pulse stimulation with a reference level, and a detector which discriminates a header added to data transmitted from said ground DME transmitter on the basis of results judged by said level detector and which extracts the transmission data.

* * * * *